Nov. 1, 1966     K. I. RAPP     3,282,736

FUEL CELL STRUCTURE AND METHOD FOR MAKING SAME

Filed Dec. 16, 1964

INVENTOR.
KENNETH I. RAPP
BY
Watson, Cole, Grindle + Watson
ATTORNEYS.

United States Patent Office 3,282,736
Patented Nov. 1, 1966

3,282,736
FUEL CELL STRUCTURE AND METHOD FOR MAKING SAME
Kenneth I. Rapp, Roslyn Heights, N.Y., assignor to Leesona Corporation, Warwick, R.I., a corporation of Massachusetts
Filed Dec. 16, 1964, Ser. No. 420,854
5 Claims. (Cl. 136—86)

This application is a continuation-in-part of my co-pending application Serial No. 21,967, filed April 13, 1960, now abandoned.

This invention relates to fuel cell electrodes, their method of manufacture, and to fuel cells employing such electrodes. More particularly, the invention relates to nickel electrodes characterized in that the peripheral area on at least one surface of an electrode is composed of a non-conductive green nickel oxide. The aforesaid peripheral area serves to insulate the electrode from an electrode of opposite potential in the cell and/or from the fuel cell housing.

One of the problems prevalent in the construction of prior art fuel cells is in the formation of suitable gaskets between the electrodes of the fuel cell and between the electrodes and the fuel cell housing. The electrodes which normally develop opposite potentials are preferably mounted as a complete unit in the cell for the sake of confining the chemical reaction, and thereby achieving the maximum efficiency of the chemical reaction. In these prior art fuel cells, the chemical reaction takes place in a very efficient manner at high temperatures and pressures, but only somewhat sluggishly at lower temperatures and pressures. At high temperatures and pressures, however, the selection of a suitable gasketing material is critical. Polytetrafluoroethylene and other known insulating materials which are suitable for gaskets at lower temperatures and pressures are not desirable under such conditions in that polytetrafluoroethylene tends to "flow" when subjected to elevated temperatures and pressures.

According to one aspect of the invention, there is provided an electrode composed of nickel characterized in that the peripheral area of at least one surface of the electrode comprises a non-conductive green nickel oxide. The invention also provides a fuel cell having a pair of electrodes comprising a first electrode of the kind described above and a second electrode formed of a metallic material, the said part of the peripheral area of the first electrode, which is nonconductive green nickel oxide, providing a fluid-type seal between said first electrode and said second electrode.

According to a further aspect of the invention, there is provided a fuel cell comprising as elements a housing, at least one fuel electrode and at least one oxidizing electrode with insulating material separating said elements, the fuel cell characterized in that the insulating material is a nonconductive green nickel oxide which is formed as an integral part of the peripheral area of at least one of the electrodes of the fuel cell.

According to a further aspect of the invention, the fuel cell housing is composed of nickel with at least one electrode being separated from the housing by means of a nonconductive green nickel oxide insulating area which is an integral part of the nickel housing.

The above and other objects of the invention will be apparent from the following detailed description with particular emphasis being placed on the drawing.

It is known that certain of the metallic oxides produce a layer which exhibits a high electrical resistance. For example, Bacon U.S. Patent No. 2,716,670, column 1, paragraph 4, mentions that a coating of green nickel oxide is not practicable as an electrode surface because the coating exhibits a high, electrical resistance. This statement is made with regard to the area of the electrode in contact with the electrolyte. It has now been discovered, however, that this apparent disadvantage can be employed to simplify the cost of construction of a fuel cell by employing a highly resistant metallic oxide coating, such as nickel oxide, as the insulator between adjacent electrodes and/or between the electrodes and the cell housing. If the electrode is formed of nickel, it is only necessary to oxidize the periphery which will be in contact with the adjacent electrode or with the housing.

Two embodiments of the invention will now be described by way of example, reference being made to the accompanying drawing wherein.

Figure 1:
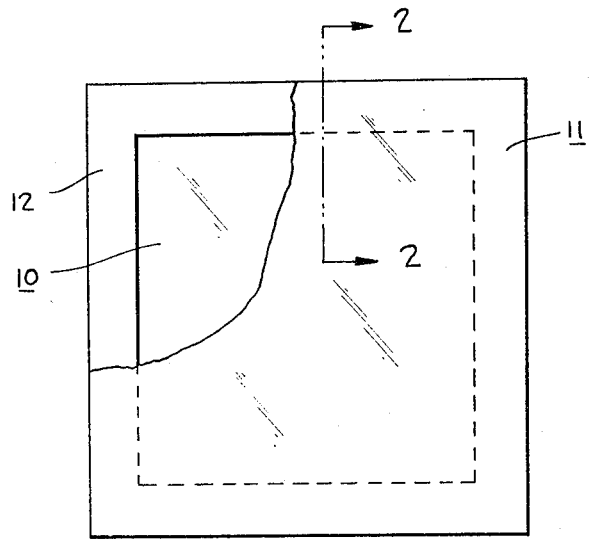
FIGURE 1 is a view in elevation of one illustrative embodiment of the invention.
Figure 2:
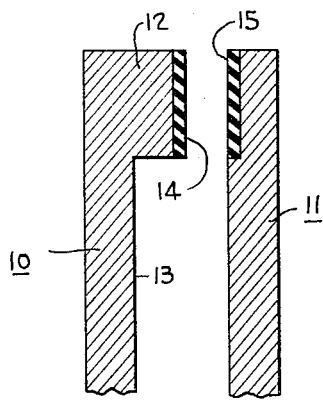
FIGURE 2 is a section taken along lines 2—2 of FIGURE 1.
Figure 3:
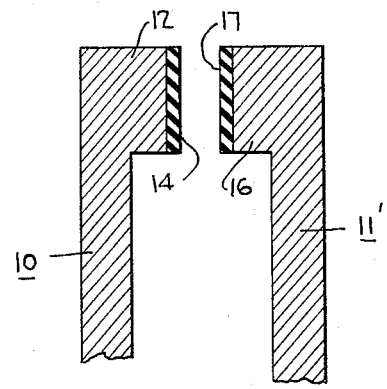
FIGURE 3 is a partial view in section of another illustrative embodiment of this invention.

Referring now to FIGURES 1 and 2, there is shown a pair of electrodes 10 and 11 for a fuel cell, the electrode 10 having a peripheral area 12 which, in this particular embodiment, is raised with respect to the remaining surface 13. The electrode 10 may be formed of a metal such as nickel and subsequent to the formation of the electrode, the peripheral area 12 may be oxidized to form a nickel oxide layer or coating 14, which is a non-conductive coating. In such a structure, the adjacent electrode 11 of the pair of electrodes may be in the form of a flat plate as shown in FIGURE 2. Advantageously, electrode 11 may have its peripheral area oxidized as shown at 15. The electrode structure can be modified as shown in FIGURE 3 in order that the electrode 11 can have a cooperating raised portion 16 similar to that of the raised portion 12 as shown in FIGURE 3. With either of these arrangements, a pocket is defined between the electrode surfaces to retain the electrolyte material which may be in the form of a caustic such as potassium hydroxide. During the operation of the fuel cell, the electrolyte may reach temperatures in the order of 200° C. and pressures of the order of 400 p.s.i. Since the metallic non-conductive nickel oxide gaskets formed integral with the electrodes is not effected by a caustic or acidic material, even at elevated temperatures and pressures, the fuel cell will operate in a highly efficient and reliable manner. It will be understood that only one non-conducting surface is required to define an electrical insulating gasket and the other may be eliminated. Also, the electrode 10 and electrode 11 in the electrode pair arrangement need not have raised portions 12 and 13 respectively, provided a pocket remains between them.

Further, the metallic oxide may be deposited on a part of the surface area of the electrode as distinct from a part of the surface area of the electrode being oxidized.

The metallic oxide performs the dual function of spacing one electrode from an adjacent electrode and defining a fluid-type seal of gasket-between the electrodes. As is apparent, where it is essential to insulate the electrodes from the metallic housing, the non-conductive surface may be formed integral with the housing rather than with the electrode.

The green nickel oxide layer, as will be appreciated, can be formed by procedures known in the art such as heat in an atmosphere of air. The area of the electrode or housing not to be oxidized can be masked by suitable means.

The electrodes of the present invention may be employed with any of the conventional fuel cells such as the one shown in Bacon U.S. Patent No. 2,969,315 which illustrates the use of bi-polar electrode amounts. In such cells, the electrolyte can be a material such as potassium hydroxide or phosphoric acid, with the cell being operated with hydrogen as the fuel and oxygen as the oxidant. These materials are fed to the electrodes by suitable means.

I claim:

1. A fuel cell for the direct generation of electrical energy from a fuel and oxidant comprising as elements, a metal housing, at least one fuel electrode, and at least one oxidizing electrode, said elements being maintained in working association and separated from each other with an insulating material, said insulating material between said metal housing, and at least one electrode being a non-conductive green nickel oxide which is formed as an integral part of at least one of said elements.

2. The fuel cell of claim 1 wherein the electrode comprises nickel and said non-conductive green nickel oxide is an integral part thereof.

3. The fuel cell of claim 1 wherein the metal housing comprises nickel and the insulating material is an integral part thereof.

4. A fuel cell for the direct generation of electrical energy from a fuel and oxidant comprising a housing, at least one fuel electrode, and at least one oxidizing electrode, said electrodes being in working association and separated from each other by an insulating material, said insulating material between said electrodes being a non-conductive green nickel oxide which is formed as an integral part of at least one of said electrodes.

5. The fuel cell of claim 4 wherein at least one of said electrodes has a raised area around the periphery thereof facing the second electrode, which raised area comprises the insulating material of non-conductive green nickel oxide.

References Cited by the Examiner

UNITED STATES PATENTS

| | | | |
|---|---|---|---|
| 2,461,935 | 2/1949 | Stockdale | 117—230 X |
| 2,716,670 | 8/1955 | Bacon | 136—86 |
| 2,914,596 | 11/1959 | Gorin et al. | 136—120 X |

WINSTON A. DOUGLAS, *Primary Examiner.*

N. P. BULLOCH, *Assistant Examiner.*